US006710938B2

(12) United States Patent
Fukuyama

(10) Patent No.: US 6,710,938 B2
(45) Date of Patent: Mar. 23, 2004

(54) OBJECTIVE SCANNING MICROSCOPE

(75) Inventor: Hiroya Fukuyama, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/246,432

(22) Filed: Sep. 19, 2002

(65) Prior Publication Data

US 2003/0178558 A1 Sep. 25, 2003

(30) Foreign Application Priority Data

Mar. 19, 2002 (JP) ........................................ 2002-076727

(51) Int. Cl.[7] .............................................. G02B 13/18
(52) U.S. Cl. ...................................... 359/719; 359/716
(58) Field of Search ................................ 359/719, 716, 359/793, 795

(56) References Cited

U.S. PATENT DOCUMENTS 4,927,247 A    5/1990  Tanaka et al. .............. 350/432
5,467,225 A   11/1995  Manabe ....................... 359/661
5,600,494 A    2/1997  Kubo et al. .................. 359/719
6,498,689 B2 * 12/2002  Katsuma ...................... 359/719

* cited by examiner

*Primary Examiner*—Hung X. Dang
(74) *Attorney, Agent, or Firm*—Kenyon & Kenyon

(57) ABSTRACT

An objective lens includes a first lens unit with positive refracting power and a second lens unit on the specimen side of the first lens unit. The first lens unit has at least one lens and the second lens unit has at least one optical element, satisfying the following conditions:

$$v_{dLD} > v_{dHD}$$

$$-0.56 \leq \phi_{H\textcircled{1}} / \phi_T \leq 0.56$$

where $v_{dLD}$ is the Abbe's number of glass material of the lens, $v_{dHD}$ is the Abbe's number of glass material of the optical element, $\phi_{H\textcircled{1}}$ is the refracting power of a first surface of the second lens unit, and $\phi_T$ is the refracting power of the entire system of the objective lens.

7 Claims, 23 Drawing Sheets

— — — LONG WAVELENGTH
----------- SHORT WAVELENGTH

OBJECTIVE SCANNING MICROSCOPE

BACKGROUND OF THE INVENTION

1. Field of the Invention

This invention relates to an objective lens and a scanning microscope provided with the objective lens.

2. Description of Related Art

One of conventional scanning microscopes is constructed so that light from a light source is transmitted by an optical fiber and the top face of the optical fiber is moved together with a lens (refer to Japanese Patent Kokai No. 2002-40359).

In an optical system disclosed in Kokai No. 2002-40359, monochromatic aberrations are favorably corrected. However, chromatic aberration is not completely corrected.

SUMMARY OF THE INVENTION

It is, therefore, an object of the present invention to provide an objective lens in which chromatic aberration is completely corrected and a scanning microscope provided with this objective lens.

In order to achieve the above object, the objective lens according to the present invention includes a first lens unit with positive refracting power and a second lens unit placed on the specimen side of the first lens unit. The first lens unit has at least one lens and the second lens unit has at least one optical element, satisfying the following conditions:

$$\nu_{dLD} > \nu_{dHD}$$

$$-0.56 \leq \phi_{II\text{\textcircled{1}}} / \phi_T \leq 0.56$$

where $\nu_{dLD}$ is the Abbe's number of glass material of the lens, $\nu_{dHD}$ is the Abbe's number of glass material of the optical element, $\phi_{II\text{\textcircled{1}}}$ is the refracting power of a first surface of the second lens-unit, and $\phi_T$ is the refracting power of the entire system of the objective lens.

The objective lens also satisfies the following conditions:

$$\nu_{dHD} \leq 26$$

$$d_{II}\phi_T \geq 0.63$$

where $d_{II}$ is a face-to-face spacing of the optical element of the second lens unit.

The scanning microscope according to the present invention includes a probe section having the objective lens, an actuator, and an optical fiber and a body section having a point source, a photodetector, and a light-splitting element.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

The objective lens according to the present invention includes a first lens unit with positive refracting power and a second lens unit placed on the specimen side of the first lens unit. The first lens unit has at least one lens and the second lens unit has at least one optical element, satisfying the following conditions:

$$\nu_{dLD} > \nu_{dHD} \tag{1}$$

$$-0.56 \leq \phi_{II\textcircled{1}} / \phi_T \leq 0.56 \tag{2}$$

where $\nu_{dLD}$ is the Abbe's number of glass material of the lens, $\nu_{dHD}$ is the Abbe's number of glass material of the optical element, $\phi_{II\textcircled{1}}$ is the refracting power of a first surface of the second lens unit, and $\phi_T$ is the refracting power of the entire system of the objective lens.

In this configuration, when the first lens unit is constructed with a single lens, it is achromatized in accordance with the difference of the Abbe's number of glass material between the first lens unit and the second lens unit.

Condition (1) defines the relation between the Abbe's numbers of glass materials in lenses constituting the first lens unit and the second lens unit. In order to correct chromatic aberration of an optical system, it is necessary that the optical system has a plurality of lenses or optical elements constructed of glass materials of different Abbe's numbers. This will be explained below in reference to FIGS. 1–6.

FIGS. 1–4 show the principle of correction for chromatic aberration in the present invention. Here, reference is made to the function of a combination of a single positive lens with a plane-parallel plate which is a typical configuration in the present invention.

Figure 1:
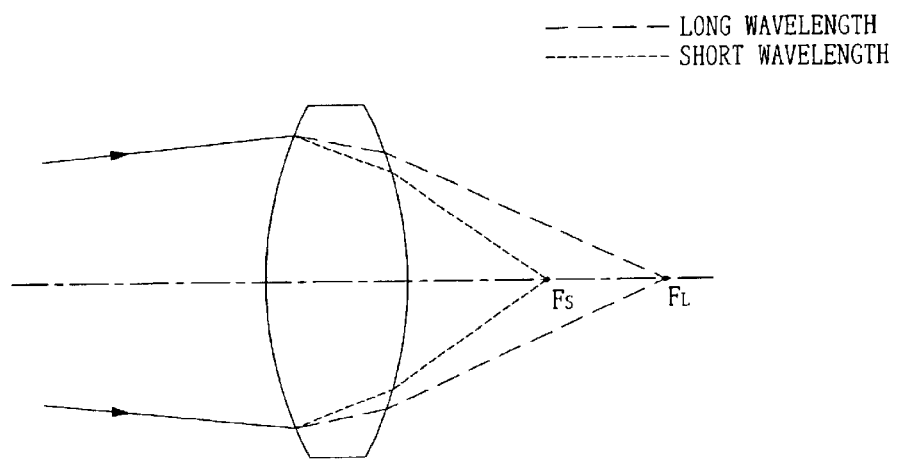
FIG. 1 is a view showing chromatic aberration of a single positive lens.

In FIG. 1, a focal point $F_L$ of rays of light of long wavelength is located farther away from a light source than a focal point $F_S$ of rays of light of short wavelength.

Figure 2:
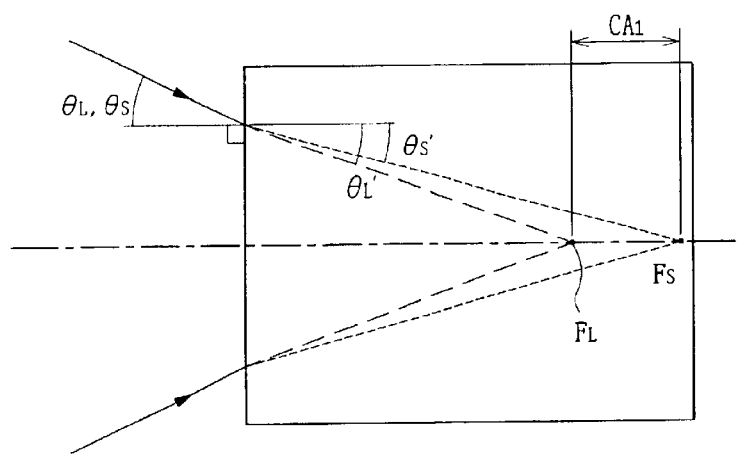
FIG. 2 is a view showing chromatic aberration where a convergent beam of light is incident from a plane interface on a medium.

In FIG. 2, the focal point $F_L$ is located closer to the light source than a focal point $F_S$. That is, convergent rays incident on a plane surface produce chromatic aberration of opposite sign with respect to the single positive lens. Although an interface is thought of as a plane here, it is not limited to the plane in practical use, and even when a concave surface is used, chromatic aberration of opposite sign is likewise produced. Even when the convex surface is used, chromatic aberration of opposite sign is likewise produced if a predetermined condition is satisfied.

Figure 5:
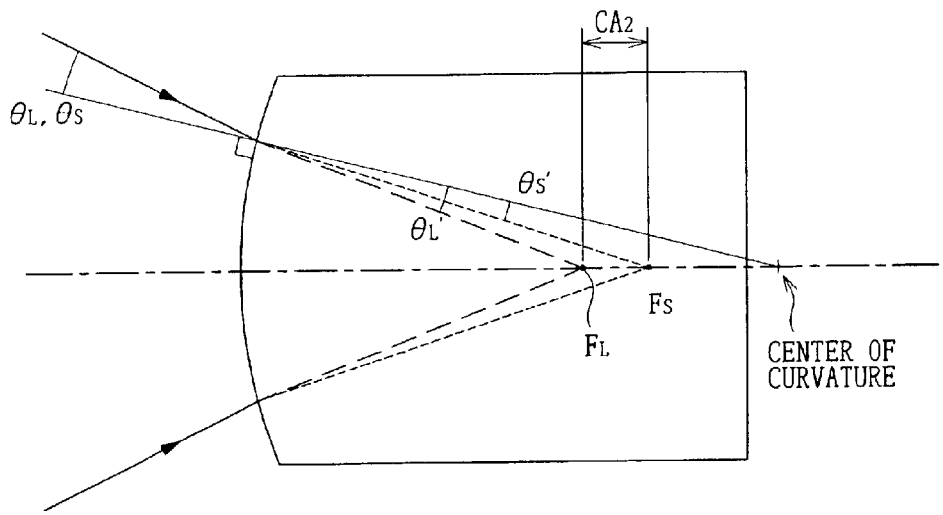
FIG. 5 is a view showing chromatic aberration where convergent light is incident on a convex surface and is subjected to refraction in the direction of divergence.
Figure 6:
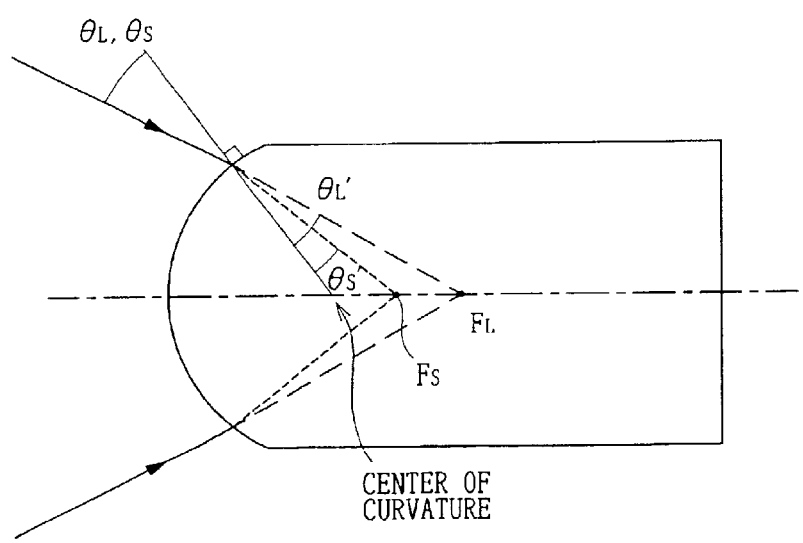
FIG. 6 is a view showing chromatic aberration where convergent light is incident on a convex surface and is subjected to refraction in the direction of wider divergence.

This will be explained below in reference to FIGS. 5 and 6. In FIG. 5, the focal point $F_L$ is located closer to the light source than the focal point $F_S$. That is, chromatic aberration of opposite sign is produced with respect to the single positive lens. In FIG. 6, the focal point $F_L$ is located farther away from the light source than the focal point $F_S$. That is, chromatic aberration of the same sign as in the single positive lens is produced. With the convex surface, as mentioned above, when it is subjected to refraction in the direction of divergence, the rays produce chromatic aberration of opposite sign with respect to the single positive lens. Thus, where chromatic aberration such as that shown in FIG. 2 is described in the following, the function of the concave surface or the convex surface shown in FIG. 5 is naturally taken into account.

Also, if the same glass material is used, the amounts of chromatic aberrations, $CA_1$ and $CA_2$, produced in FIGS. 2 and 5, respectively, have the following relation:

$$CA_1 > CA_2$$

Figure 3:
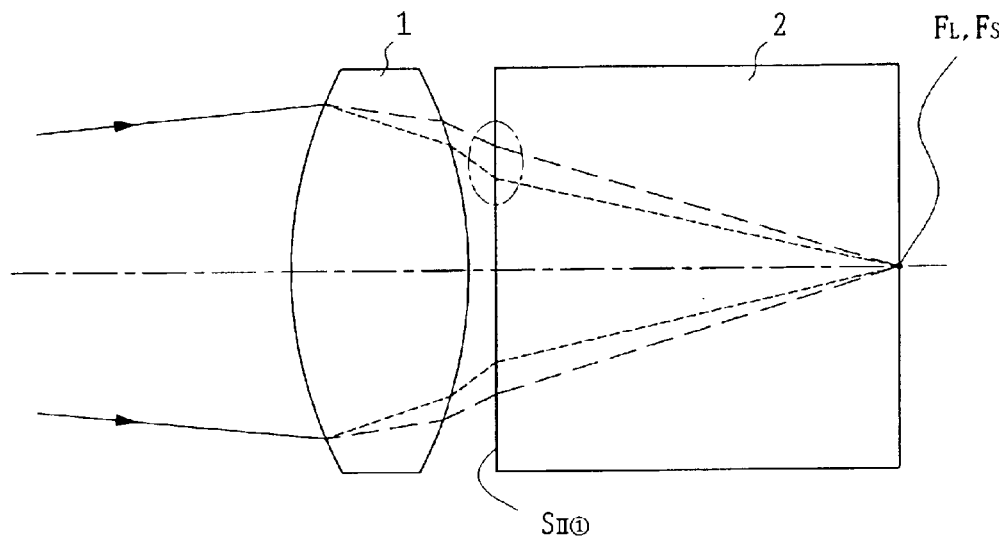
FIG. 3 is a view for explaining the principle of correction for chromatic aberration in the present invention.
Figure 4:
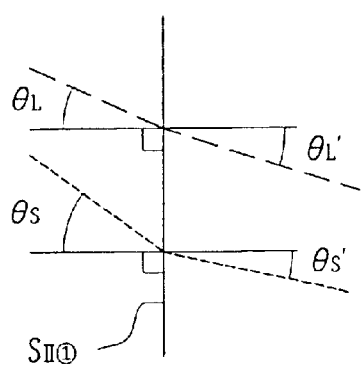
FIG. 4 is a detailed view of a part surrounded by a chain line in FIG. 3.

FIGS. 3 and 4 show the consideration of correction for chromatic aberration with the single positive lens and the plane-parallel plate. As mentioned above, the single positive lens and the medium with the plane interface suffer from chromatic aberrations of signs opposite to each other, and thus when the single positive lens as a first lens unit 1 is combined with the plane-parallel plate as a second lens unit 2, chromatic aberration can be corrected. A state of refraction of rays at the first surface ($S_{II\textcircled{1}}$) of the second lens unit 2 is shown in detail in FIG. 4. Here, chromatic aberration is produced in the first lens unit 1 and the result is as follows:

$$\theta_L < \theta_S$$

where $\theta_L$ is the angle of incidence of a ray of long wavelength and $\theta_S$ is the angle of incidence of a ray of short wavelength.

Here, in order to make the focal point $F_L$ coincide with the focal point $F_S$, namely to correct chromatic aberration, it is necessary, in FIG. 4, to satisfy the following condition:

$$\theta_L' > \theta_S'$$

where $\theta_L'$ is the angle of refraction of the ray of long wavelength and $\theta_S'$ is the angle of refraction of the ray of short wavelength. For this, the glass material used for each of the lens units should be selected so as to satisfy Condition (1).

If Condition (1) is not satisfied, it becomes difficult to balance chromatic aberrations produced in the first lens unit and the second lens unit.

Condition (2) defines the relation between the refracting power $\phi_T$ of the entire system and the refracting power $\phi_{II\textcircled{1}}$ of the first surface of the second lens unit 2. Reference is first made to the upper limit value, 0.56.

As shown in FIGS. 2 and 5, the chromatic aberration $CA_2$ produced by the spherical surface is smaller than the chromatic aberration $CA_1$ by the plane surface. This means that, in FIG. 3, when the refracting power $\phi_{II\textcircled{1}}$ of the surface $S_{II\textcircled{1}}$ is increased, the ability of the second lens unit 2 to correct chromatic aberration is impaired, and chromatic aberration of the entire system is increased. In particular, when the value of Condition (2) exceeds the limit of 0.56, chromatic aberration of the entire system is rapidly increased and it becomes difficult to suppress this aberration.

On the other hand, when the refracting power $\phi_{II\textcircled{1}}$ is a considerable, negative one, the problem of asymmetrical aberration caused by a scan, notably of coma, is produced. This respect is described with reference to FIG. 7. Here, reference numeral 3 represents an optical fiber. The first lens unit 1 and the second lens unit 2 constitute the object lens. The first lens unit 1 is constructed with a single positive lens. The second lens unit 2 is constructed with a plane-parallel plate (an optical element). Reference numeral 4 represents a base.

Figure 7:
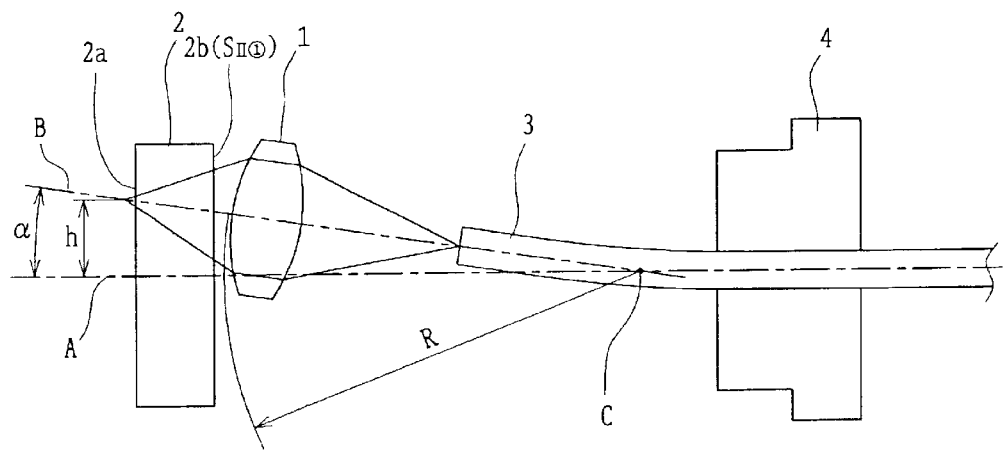
FIG. 7 is a view schematically showing an optical unit provided with the objective lens according to the present invention.

The first lens unit 1 and the optical fiber 3 execute an oscillating motion (a scan), with its center at a point indicated by symbol C in FIG. 7. Hence, an optical axis B of the first lens unit 1 makes an angle of inclination α with an optical axis A of the second lens unit 2 in accordance with the scan. When the second lens unit 2, as shown in FIG. 7, is the plane-parallel plate, the optical axis B does not become perpendicular to the surface of the plane-parallel plate with the exception of the case where the optical axis A coincides with the optical axis B. Consequently, asymmetrical aberration is produced with the exception of the above case (however, an exception is made in the case where each of an outside surface 2a and an inside surface 2b ($S_{II①}$) of the second lens unit 2 is spherical, with its center of curvature at the point C, and in this case, the asymmetrical aberration is not entirely produced, irrespective of the angle of inclination α).

As asymmetrical aberrations produced, coma holds the majority and is more considerable in the case where the refracting power $\phi_{II①}$ is negative than in the case where it is positive. If the value of Condition (2) is below −0.56 of the lower limit value, coma is rapidly increased and it becomes difficult to suppress this coma.

Thus, in order to suppress coma caused by chromatic aberration and the scan within desired tolerances, it is desirable to satisfy Condition (2).

In order to obtain better imaging performance, it is favorable to satisfy the following condition, instead of Condition (2):

$$-0.40 \leq \phi_{II①}/\phi_T \leq 0.11 \qquad (2')$$

In order to further obtain better imaging performance, it is favorable to satisfy the following condition, instead of Condition (2):

$$-0.28 \leq \phi_{II①}/\phi_T \leq 0.11 \qquad (2'')$$

If at least one of a first surface and a second surface of the first lens unit 1 is aspherical, this is more favorable for imaging performance.

The objective lens according to the present invention is designed to satisfy the following conditions:

$$v_{dHD} \leq 26 \qquad (3)$$

$$d_{II}\phi_T \geq 0.63 \qquad (4)$$

where $d_{II}$ is a face-to-face spacing of the optical element of the second lens unit.

Condition (3) defines the Abbe's number of glass material in the optical element constituting the second lens unit 2. In FIG. 2, the chromatic aberration $CA_1$ increases with decreasing Abbe's number of glass material. As will be obvious from this, in the objective lens of the present invention, in order to balance chromatic aberration produced in the first lens unit 1, it is good practice that a glass material whose Abbe's number is small is used for the second lens unit 2. If the Abbe's number exceeds the upper limit of Condition (3), chromatic aberration is rapidly increased and it becomes difficult to suppress this chromatic aberration.

The application of the objective lens of the present invention includes, for example, the observation of a biological specimen. In this case, the objective lens requires a numerical aperture of at least 0.4. Furthermore, it is necessary that chromatic aberration is corrected in a wavelength range, at least, from the F line (486.1 nm) to the C line (656.3 nm). By satisfying the above conditions, the objective lens provided with such optical properties can be realized.

In order to correct chromatic aberration more favorably, it is desirable to satisfy the following condition, instead of Condition (3):

$$18.9 \leq v_{dHD} \leq 20 \qquad (3')$$

Condition (4) defines the relation between the refracting power $\phi_T$ of the entire system and the face-to-face spacing $d_{II}$ of the optical element of the second lens unit 2. This respect is described with reference to FIG. 8.

Figure 8:
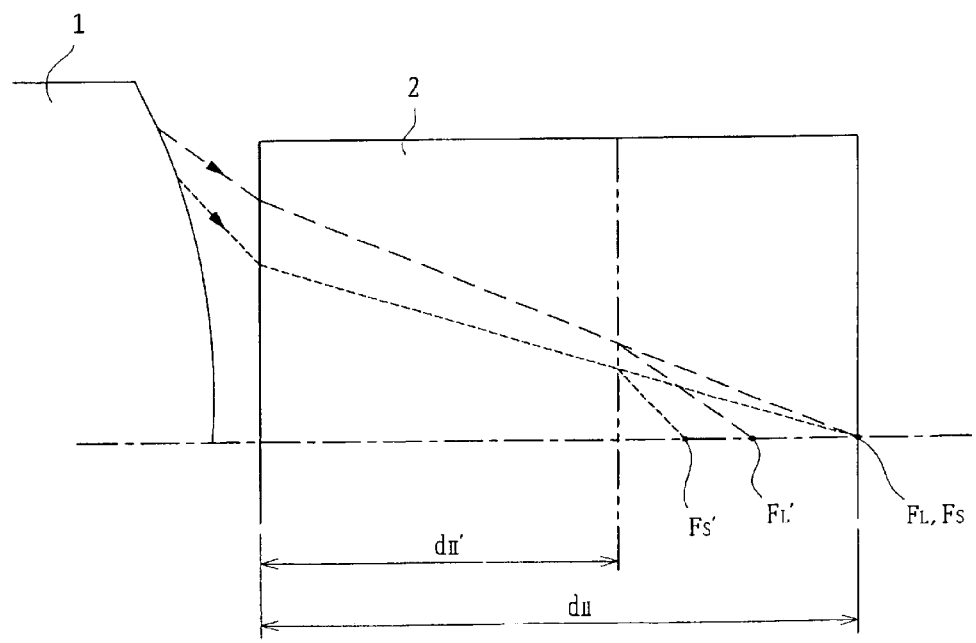
FIG. 8 is a view for explaining how chromatic aberration produced in a first lens unit is balanced by a second lens unit.

The objective lens of the present invention, as mentioned above, is designed so that chromatic aberration produced in the first lens unit 1 is balanced by that of the second lens unit 2. Chromatic aberration produced in the first lens unit 1, as shown in FIG. 8, is balanced gradually as the thickness $d_{II}$ of the second lens unit 2 increases, and a focus is taken at the focal pints $F_L$ and $F_S$. If the second lens unit 2 has a less thickness $d_{II}'$, chromatic aberration of the entire system remains and the focal points are separated into focal pints $F_L'$ and $F_S'$.

This is because chromatic aberration produced in the second lens unit 2 is proportional to the face-to-face spacing $d_{II}$. On the other hand, the amount of chromatic aberration to be produced in the second lens unit 2 is proportional to the focal length of the entire system, and therefore, to the refracting power $\phi_T$ of the entire system.

If the value of Condition (4) is below the lower limit, chromatic aberration is rapidly increased and it becomes difficult to suppress this chromatic aberration. In particular, to realize the objective lens meeting the above specifications (a numerical aperture of at least 0.4 and the wavelength range of the F line (486.1 nm) from the C line (656.3 nm)), it is favorable to satisfy Condition (4).

The objective lens of the present invention is constructed so that the first lens unit 1 is a cemented doublet and satisfies the following condition: $v_{dLD} > v_{dI(2)} > v_{dHD}$, where $v_{dLD}$ is the Abbe's number of glass material of one lens of the doublet and $V_{dI(2)}$ is the Abbe's number of glass material of the other lens. By this construction, chromatic aberration can be favorably corrected.

Further, the objective lens of the present invention is constructed so that when a paraxial radius of curvature of the first surface of the first lens unit 1 is denoted by $R_{I①}$ and the paraxial radius of curvature of the second surface is denoted by $R_{I②}$, the first lens unit satisfies the following condition:

$$R_{I①}/R_{I②} \leq -0.7 \qquad (5)$$

Condition (5) defines the relation between the paraxial radii of curvature $R_{I①}$ and $R_{I②}$ of the first lens unit 1. In particular, to realize the objective lens meeting the above specifications (a numerical aperture of at least 0.4 and the wavelength range of the F line (486.1 nm) from the C line (656.3 nm)), it is favorable to satisfy this condition.

Figure 9:
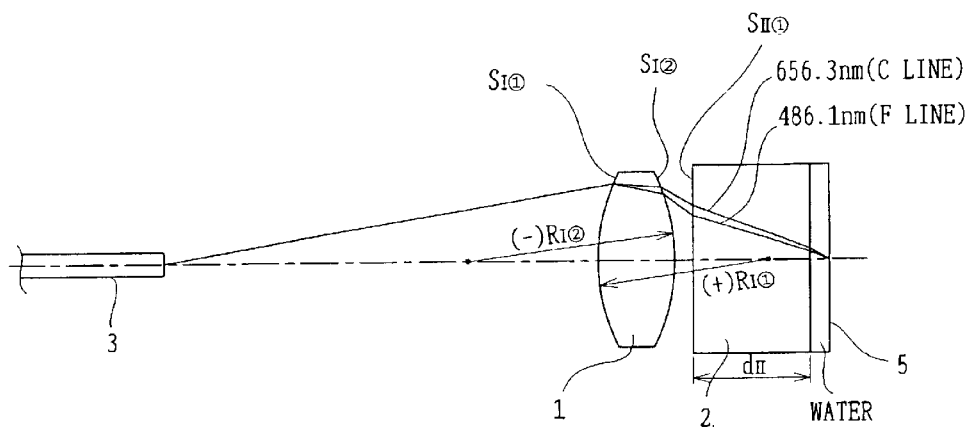
FIG. 9 is a view for explaining a paraxial radius of curvature of the first lens unit.

Also, the paraxial radius of curvature $R_{I①}$, as shown in FIG. 9, refers to a surface $S_{I①}$, on the side of the optical fiber 3, of the first lens unit 1. The paraxial radius of curvature $R_{I②}$ refers to a surface $S_{I②}$ on the side of the second lens unit 2.

Subsequently, a description is given of Condition (5) with reference to FIGS. 10A and 10B. As described in Condition (4), to favorably correct chromatic aberration, it is desirable that the second lens unit 2 has the sufficient thickness $d_{II}$. Moreover, in order to bring the focal point onto a specimen surface 5 through the second lens unit 2, it is necessary that the paraxial radii of curvature $R_{I①}$ and $R_{I②}$ satisfy some condition.

Figure 10A:
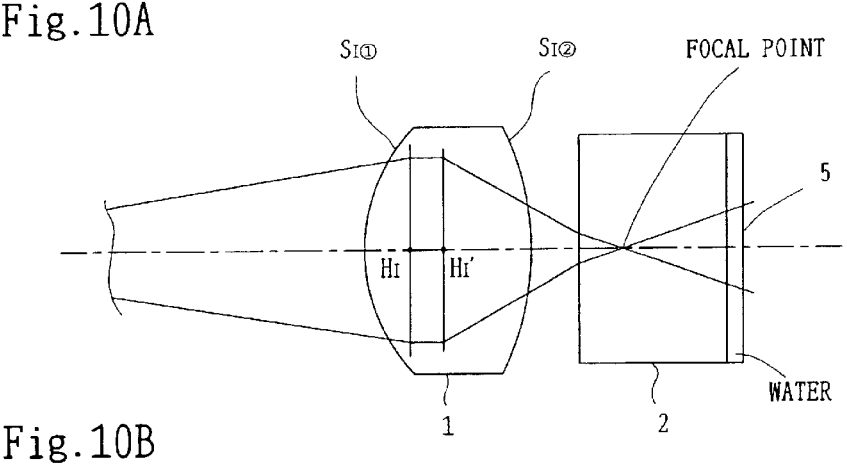
FIGS. 10A and 10B are views for explaining correction for chromatic aberration.
Figure 10B:
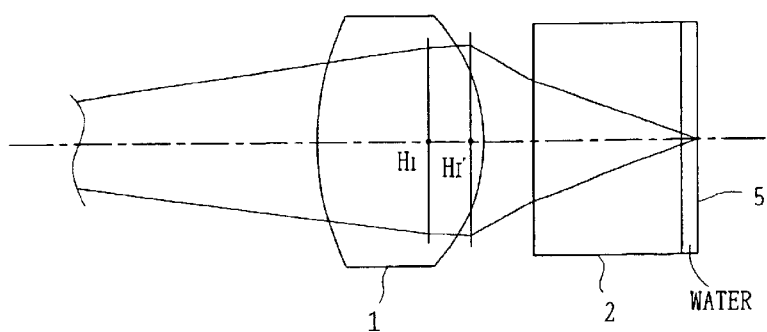

As depicted in FIG. 10A, when a refracting power $\phi_{I①}$ of the surface $S_{I①}$ of the first lens unit 1 is extremely stronger than a refracting power $\phi_{I②}$ of the surface $S_{I②}$, a principal point H' is separated from the specimen surface 5. Consequently, the focal point is not imaged on the specimen surface 5 and is located inside the second lens unit 2 of large thickness. As depicted in FIG. 10B, however, when the refracting power $\phi_{I①}$ is not very much stronger than the refracting power $\phi_{I②}$, the principal point H' approaches the specimen surface 5. Hence, the focal point can be located on the specimen surface 5. Condition (5) gives the condition for bringing the focal point onto the specimen surface 5 as in FIG. 10B, in terms of the paraxial radii of curvature $R_{f_{(1)}}$ and $R_{f_{(2)}}$. If the upper limit of this condition is passed, it becomes difficult to locate the focal point on the specimen surface 5 in a state where chromatic aberration is corrected.

According to the present invention, the scanning microscope includes a probe section having the objective lens, an actuator, and an optical fiber and a body section having a point source, a photodetector, and a light-splitting element so that illuminating light from the point source is converged in a specimen through the light-splitting element, the optical fiber, and the objective lens.

In accordance with the embodiments shown in the drawings, the present invention will be described below.

Figure 11:
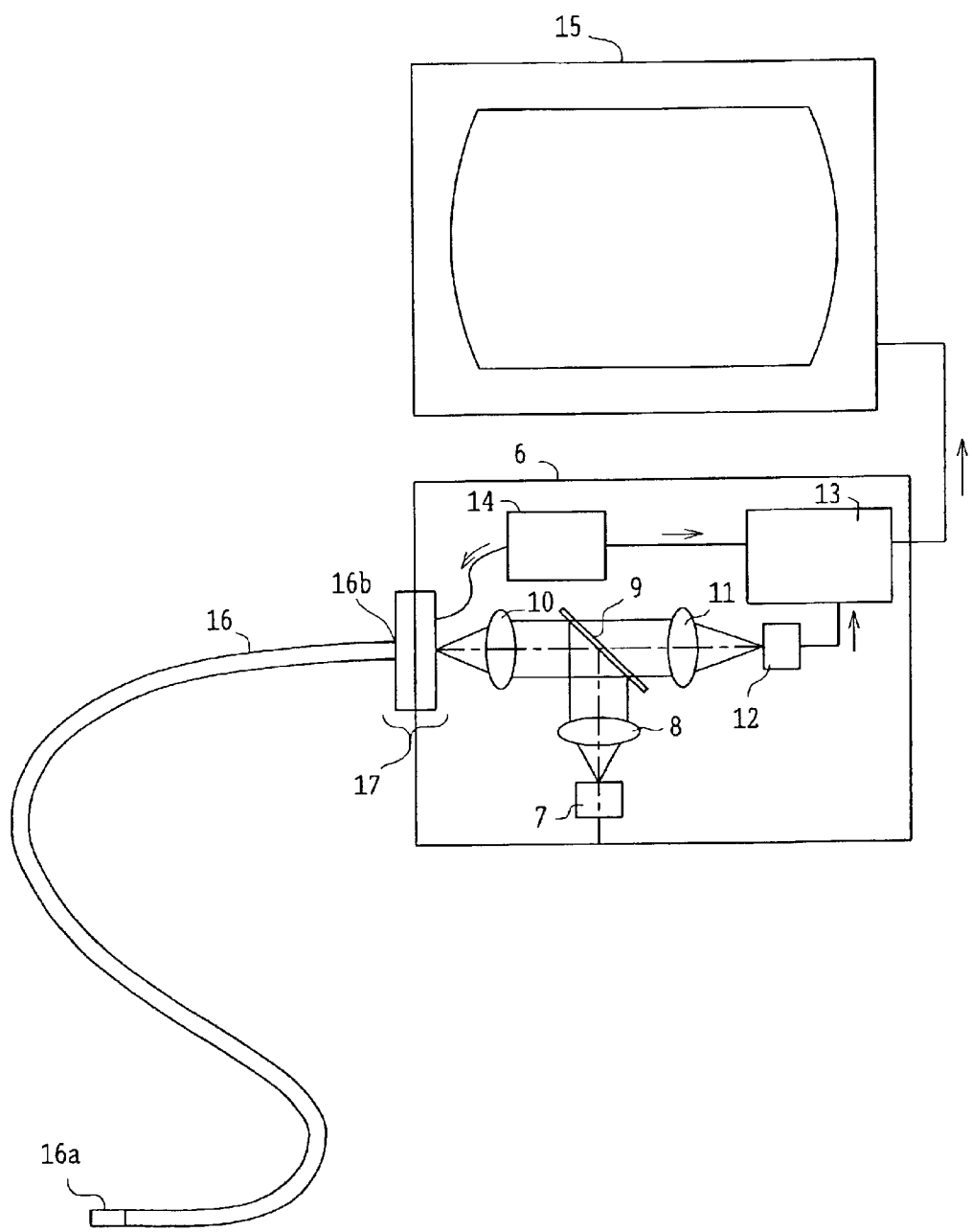
FIG. 11 is a view schematically showing one embodiment of an objective scanning microscope using the objective lens according to the present invention.

FIG. 11 shows one embodiment of the objective scanning microscope using the objective lens according to the present invention. In this figure, reference numeral 6 designates a microscope body. The microscope body 6 includes a laser oscillator 7, a beam collimator lens 8, a dichroic mirror (a light-splitting element) 9, condenser lenses 10 and 11, a photodetector 12, an image forming circuit 13, and an actuator driver 14. Reference numeral 15 designates a monitor connected to the image forming circuit 13.

Reference numeral 16 represents a probe. The probe 16 incorporates an optical fiber and a cable. A distal end 16a of the probe 16 is provided with the objective lens of the present invention, which will be described later, and an actuator. A proximal end 16b of the probe 16 is connected to the microscope body 6 through a removable connector 17. The microscope is designed so that when the proximal end 16b of the probe 16 is connected to the microscope body 6, the entrance end of the optical fiber incorporated therein is located at the condensing point of a laser beam with the condenser lens 10.

When the objective scanning microscope mentioned above is used as a fluorescence microscope, laser light from the laser oscillator 7 (for example, light with a narrow range of wavelengths) is used as illuminating light (exciting light). By the irradiation of this exciting light, fluorescent light emanates from the specimen, but the fluorescent light is different in wavelength from the illuminating light. The fluorescent light is condensed in the photodetector 12 through the objective lens, the optical fiber, and the light-splitting element 9. The light-splitting element 9 is located at a position where an optical path from the light source to the optical fiber crosses an optical path from the optical fiber to the photodetector 12.

Figure 12:
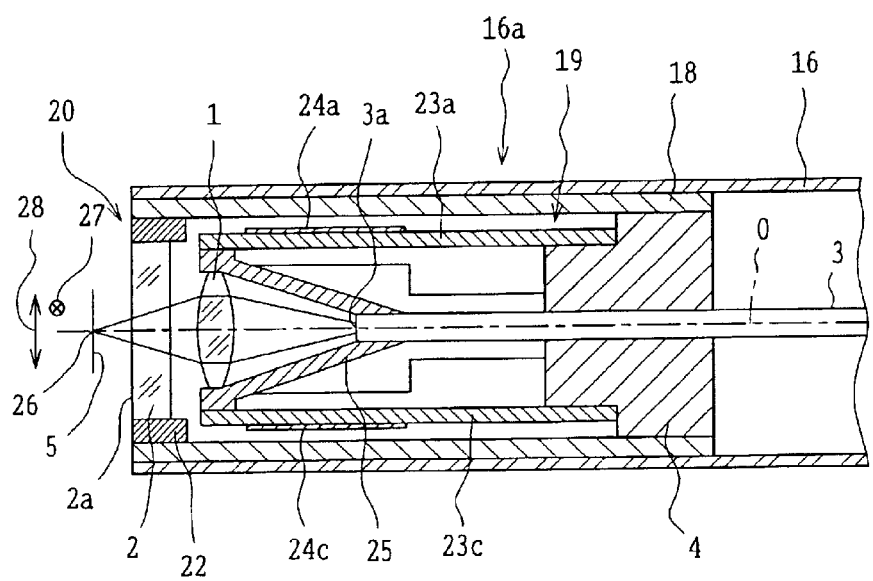
FIG. 12 is a sectional view showing the distal end of a probe of FIG. 11.

The structure of the distal end 16a of the probe 16 is shown in FIG. 12. At the top of the probe 16, an optical frame 18 is mounted to one end thereof. An optical unit 19 is mounted inside the optical frame 18. The top of the optical frame 18 is provided with a top cover unit 20.

The optical fiber 3 is encased in the probe 16, and its top end is fixed to the optical unit 19. Light emerging from a top face 3a of the optical fiber 3 becomes convergent light through a converging optical system (the first lens unit 1). The light is then transmitted through a glass cover (the second lens unit 2) which functions also as an optical protecting member, and is converged on the specimen surface 5. The glass cover 2 serves to correct chromatic aberration produced in the converging optical system 1.

The fluorescent light from the specimen surface 5 is converged on the top face 3a of the optical fiber 3 through the glass cover 2 and the converging optical system 1. The fluorescent light converged on the top face 3a of the optical fiber 3 emerges from the base face (not shown) of the optical fiber 3 and is transmitted through the condenser lens 10, the dichroic mirror 9, and the condenser lens 11 to enter the photodetector 12. An image signal output from the photodetector 12 is imaged by the image forming circuit 13 and is displayed as a fluorescent image of the specimen on the monitor 15.

The top cover unit 20 includes a cover holder 22 and the glass cover 2 fixed to the cover holder 22. The cover holder 22 is fixed to the top end of the optical frame 18. By this structure, the distal end 16a of the probe 16 is enclosed so that water-tightness is maintained.

Figure 13:
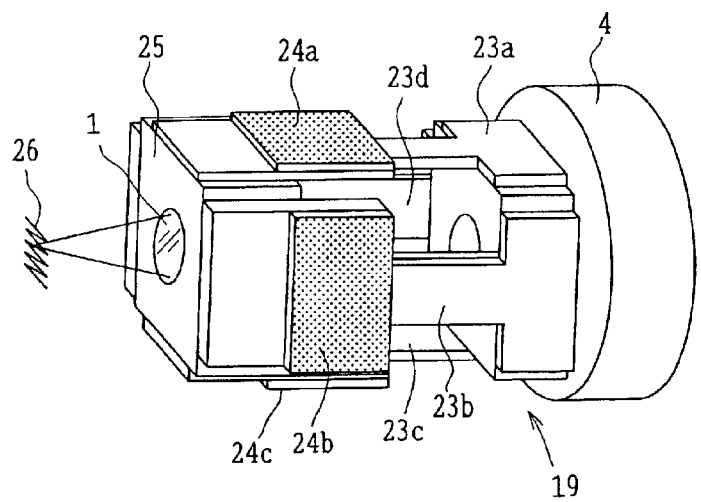
FIG. 13 is a perspective view showing an optical unit of FIG. 12 in detail.

FIG. 13 shows the details of the optical unit 19. The base 4 of the optical unit 19 is fixed to the optical frame 18. To the base 4, the rear ends of parallel sheets 23a, 23b, 23c, and 23d arranged in pairs are fastened. Specifically, the sheets 23a and 23c, as well as the sheets 23b and 23d, constituting a parallel plate spring are arranged so that their sheet surfaces are parallel with each other. The sheet 23a (or 23c) and the sheet 23b (or 23d) are such that their sheet surfaces are perpendicular to each other. The rear ends of the sheets are fixed to the base 4, and portions on the front end side thereof, as opposed to the rear end side, can be resiliently deformed at will in vertical and lateral directions.

Moreover, piezoelectric elements 24a, 24b, 24c, and 24d (which are not shown) are mounted to the sheets 23a, 23b, 23c, and 23d, respectively, at positions close to the front ends of the sheets. Each of the piezoelectric elements 24a, 24b, 24c, and 24d is plate-shaped and is polarized in the direction of its thickness. A cable (not shown) for driving each of the piezoelectric elements 24a, 24b, 24c, and 24d is encased in the probe 16 and is connected to the actuator driver 14 through the connector 17.

A lens holder 25 is attached to the front ends of the four sheets 23a, 23b, 23c, and 23d. The converging optical system 1 and the front end of the optical fiber 3 are fastened to the lens holder 25. Also, a core at front end of the optical fiber 3 functions as a pinhole and as a result, this optical system is constructed as a confocal optical system.

Driving signals are delivered to the piezoelectric elements 24a, 24b, 24c, and 24d from the actuator driver 14, and thereby the specimen can be scanned with light. Specifically, when the driving signals are delivered, the sheets 23a, 23b, 23c, and 23d are deformed so that each sheet on the front end side, as opposed to the rear end side, is bent in a direction perpendicular to the sheet surface. Whereby, the lens holder 25 sustained at the front end is moved in a direction in which each sheet is bent by deformation. As a result, the front end of the optical fiber 3 supported by the lens holder 25 is moved together with the converging optical system 1, and the specimen is scanned with emergent light.

In this case, the center (the principal ray) of a light beam emerging from the optical fiber 3 always coincides with the optical axis of the converging optical system 1. Thus, it is merely necessary to consider axial imaging performance alone in designing the converging optical system 1.

The piezoelectric elements 24a, 24b, 24c, and 24d are driven and thereby a condensing point 26 can be scanned in a horizontal (X) direction 27 and a vertical (Y) direction 28. A scanning plane in this case is nearly perpendicular to the axis of the distal end of the probe 16. Where this probe 16 is used, an outer surface 2a of the glass cover 2 is pressed against the specimen surface 5. In this way, a two-dimensional plane image (scanning plane) of a specified depth of the specimen is obtained.

In the scan, the converging optical system 1 and the optical fiber 3 execute the oscillating motion, with a center of rotation at the point C located on the optical axis (FIG. 7). The position of the center of rotation C is governed by the dimensions of the sheets 23a, 23b, 23c, and 23d. With the oscillating motion, the optical axis of the converging optical system 1 has the angle of inclination α.

The objective lens of the first embodiment in the present invention will be described below.

Figure 14:
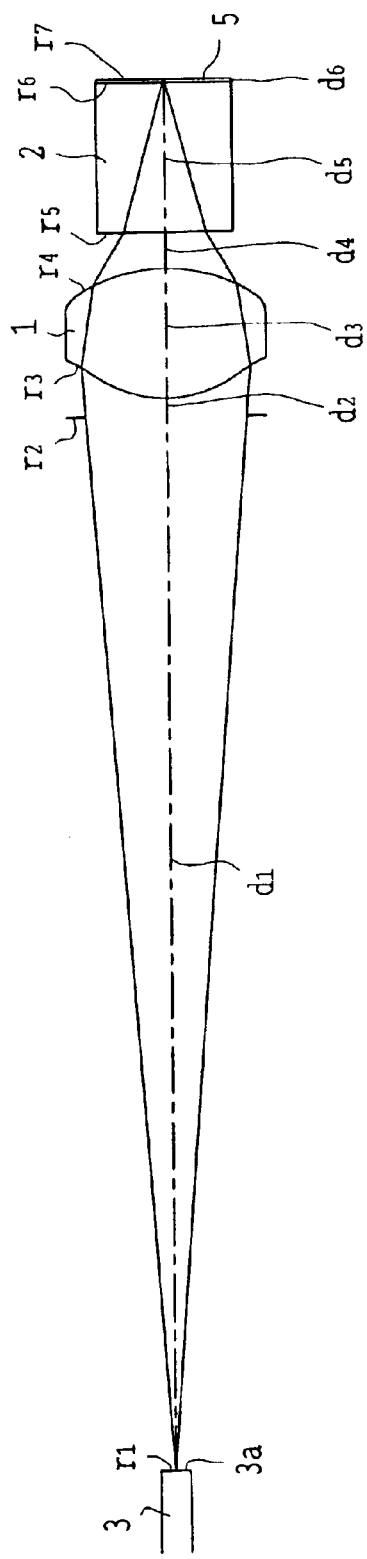
FIG. 14 is a view showing the optical path of the objective lens of a first embodiment in the present invention.
Figure 15:
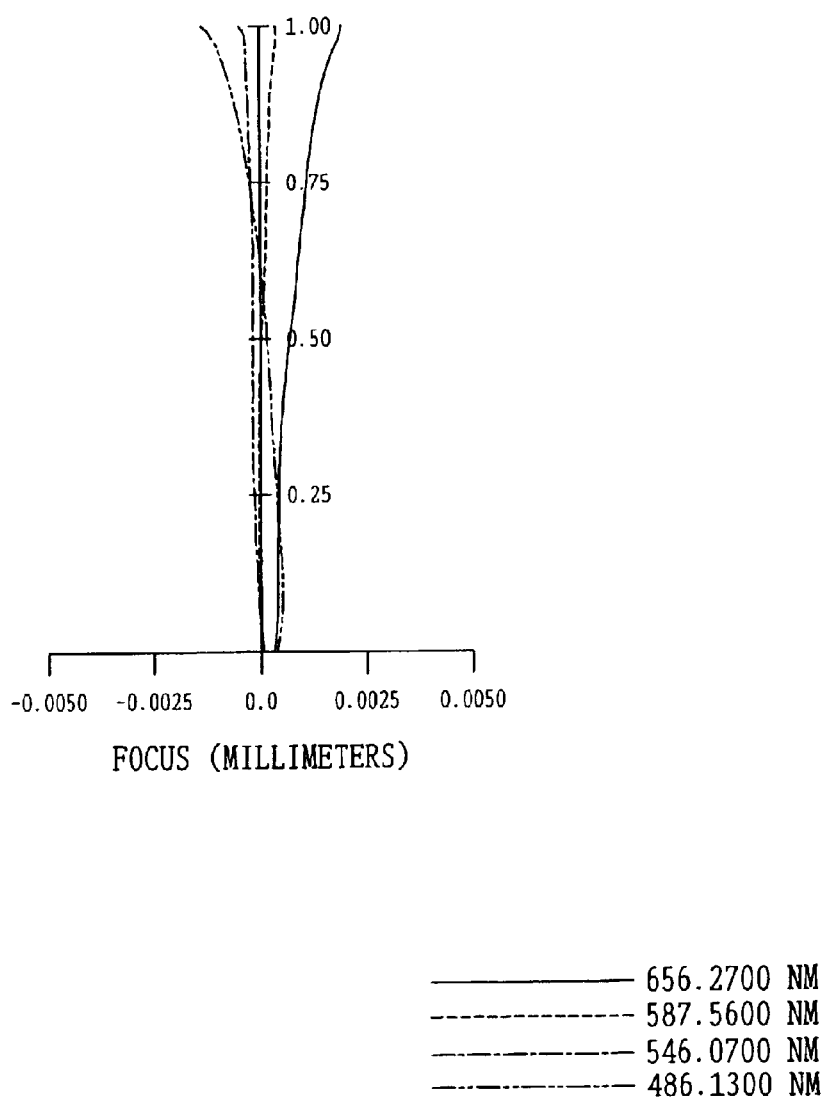
FIG. 15 is a view showing axial chromatic aberration in the first embodiment.
Figure 16:
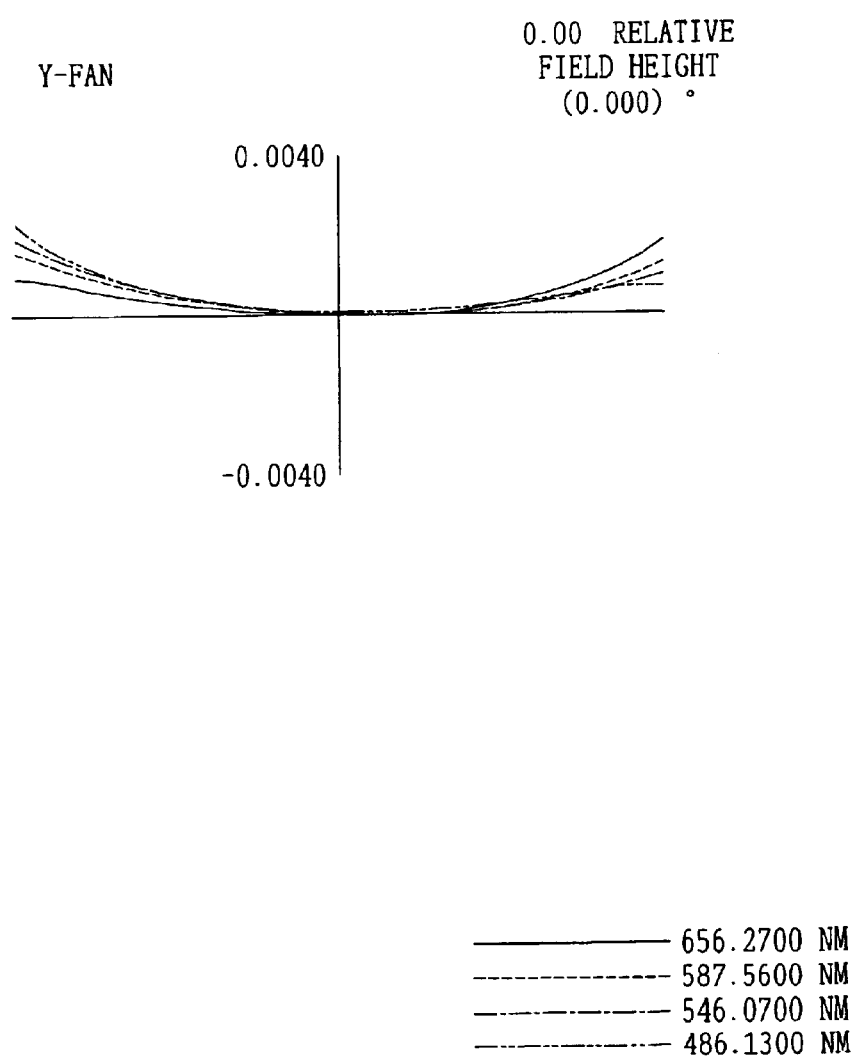
FIG. 16 is a view showing lateral coma in the first embodiment.

FIG. 14 shows the optical path of this embodiment, FIG. 15 shows axial chromatic aberration, and FIG. 16 shows lateral coma.

In the first embodiment, the first lens unit 1 is constructed with a single lens, the second lens unit 2 is constructed with a plane-parallel plate, and the optical system is indicated by symbols r1–r6. A gap between symbols r6 and r7 is filled with water.

Achromatizing is performed in accordance with the difference in the Abbe's number between the first lens unit 1 and the second lens unit 2. Chromatic aberration is corrected within the wavelength range of the F line (486.13 nm) to the C line (656.27 nm) in order to observe a fluorescent image. Since in the scanning operation the first lens unit 1 and the exit end face 3a of the optical fiber 3 are integrally moved, only axial aberration is corrected.

The amount of aberration where wave aberration is below 0.07λ (RMS) can be tolerated for the microscope. In the first embodiment, the wave aberration is 0.0225λ (RMS) and thus high imaging performance is ensured. Also, the lateral magnification is 0.153, the NA is 0.5, and the focal length is 1.0845 (mm).

Optical data of the first embodiment are shown below.

--- r1 = ∞ (fiber end face 3a)
   d1 = 5.764476
r2 = ∞ (stop)
   d2 = 0.100000
r3 = 0.63223 (aspherical)
   d3 = 0.700000    $n_{d3}$ = 1.497    $v_{d3}$ = 81.61
r4 = −0.70942 (aspherical)
   d4 = 0.2
r5 = ∞
   d5 = 0.815524    $n_{d5}$ = 1.92286    $v_{d5}$ = 18.9
r6 = ∞
   d6 = 0.02    $n_{d6}$ = 1.333    $v_{d6}$ = 55.79
r7 = ∞ (scanning plane)

---

Aspherical coefficients
Third surface

---

K = −0.751319
A = −0.324231 × $10^{-1}$    B = −0.274054 × $10^0$
C = −0.369527 × $10^0$    D = −0.948859 × $10^1$

---

Fourth surface

---

K = 0.660194
A = 0.212630 × $10^1$    B = −0.515319 × $10^1$
C = 0.716956 × $10^1$    D = 0.192504 × $10^2$

---

Figure 17:
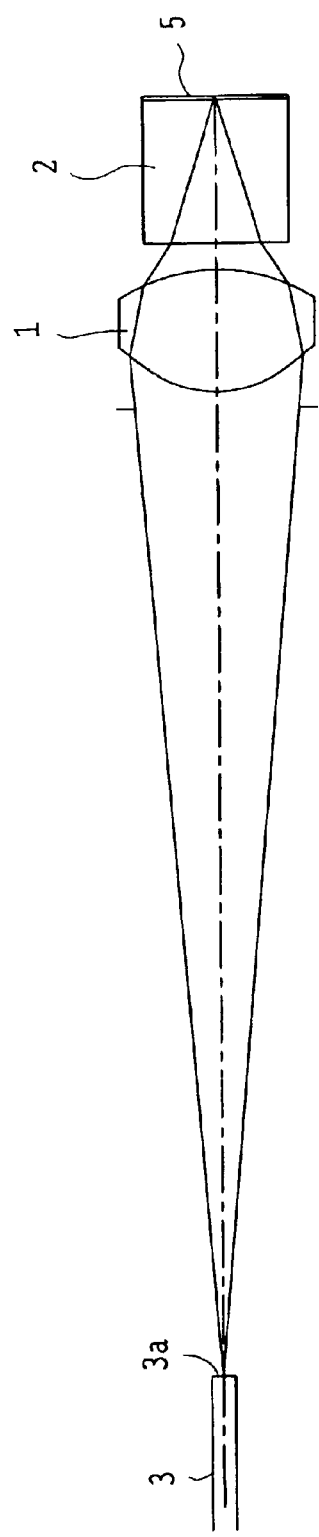
FIG. 17 is a view showing the optical path of the objective lens of a second embodiment in the present invention.

FIG. 17 shows the optical path of the objective lens of the second embodiment in the present invention. In this embodiment, like numerals are used for like optical members with respect to the first embodiment. The wave aberration is 0.0191λ (RMS). The lateral magnification is 0.153, the NA is 0.55, and the focal length is 1.0394 (mm).

Optical data of the second embodiment are shown below.

--- r1 = ∞ (fiber end face 3a)
   d1 = 5.513453
r2 = ∞ (stop)
   d2 = 0.100000
r3 = 0.58572 (aspherical)
   d3 = 0.700000    $n_{d3}$ = 1.497    $v_{d3}$ = 81.61
r4 = −0.69076 (aspherical)
   d4 = 0.150000
r5 = ∞
   d5 = 0.816547    $n_{d5}$ = 1.92286    $v_{d5}$ = 18.90
r6 = ∞
   d6 = 0.020000    $n_{d6}$ = 1.333    $v_{d6}$ = 55.79
r7 = ∞ (scanning plane)

---

Aspherical coefficients
Third surface

---

K = −0.971934
A = 0.143551 × $10^0$    B = −0.169655 × $10^0$
C = 0.197615 × $10^1$    D = −0.113507 × $10^2$

---

Fourth surface

---

K = 0.000000
A = 0.223457 × $10^1$    B = −0.540933 × $10^1$
C = 0.511366 × $10^1$    D = 0.584641 × $10^1$

---

Figure 18:
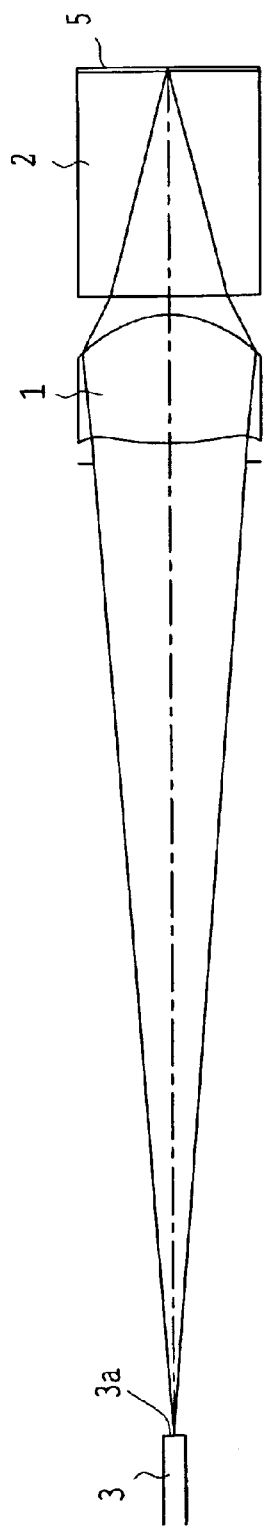
FIG. 18 is a view showing the optical path of the objective lens of a third embodiment in the present invention.

FIG. 18 shows the optical path of the objective lens of the third embodiment in the present invention. In this embodiment also, like numerals are used for like optical members with respect to the first embodiment. The wave aberration is 0.0365λ (RMS). The lateral magnification is 0.153, the NA is 0.5, and the focal length is 1.0124 (mm).

Optical data of the third embodiment are shown below.

--- r1 = ∞ (fiber end face 3a)
   d1 = 5.200000
r2 = ∞ (stop)
   d2 = 0.100000
r3 = 1.75535 (aspherical)
   d3 = 0.700000    $n_{d3}$ = 1.497    $v_{d3}$ = 81.61
r4 = −0.41717 (aspherical)
   d4 = 0.100000
r5 = ∞
   d5 = 1.200000    $n_{d5}$ = 1.80809    $v_{d5}$ = 22.80
r6 = ∞
   d6 = 0.004799    $n_{d6}$ = 1.333    $v_{d6}$ = 55.79
r7 = ∞ (scanning plane)

---

Aspherical coefficients
Third surface

---

K = −102.874069
A = 0.248378 × $10^1$    B = −0.196887 × $10^2$
C = 0.838841 × $10^2$    D = −0.269475 × $10^3$

Fourth surface

| | |
|---|---|
| K = −0.412152 | |
| A = 0.393592 × 10¹ | B = −0.103352 × 10² |
| C = 0.501692 × 10¹ | D = 0.662751 × 10² |

Figure 19:
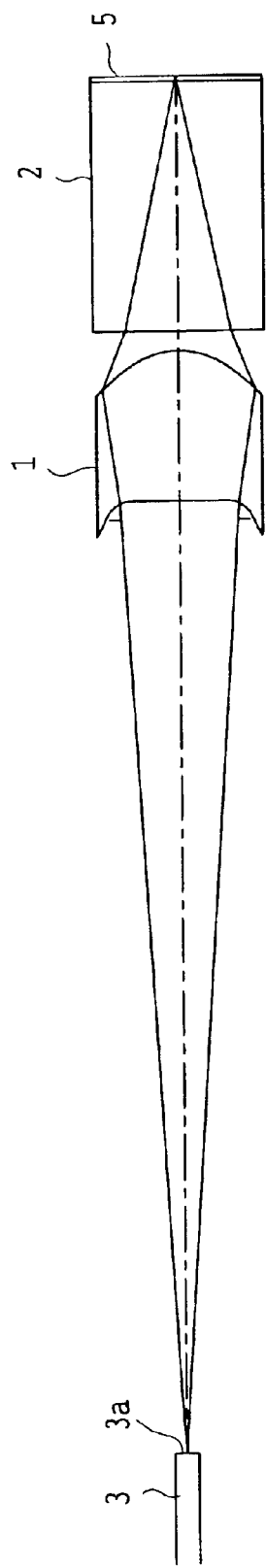
FIG. 19 is a view showing the optical path of the objective lens of a fourth embodiment in the present invention.

FIG. 19 shows the optical path of the objective lens of the fourth embodiment in the present invention. In this embodiment also, like numerals are used for like optical members with respect to the first embodiment. The wave aberration is 0.0419λ (RMS). The lateral magnification is 0.153, the NA is 0.4, and the focal length is 0.9885 (mm).

Optical data of the fourth embodiment are shown below.

| | | |
|---|---|---|
| r1 = ∞ (fiber end face 3a) | | |
| d1 = 4.955571 | | |
| r2 = ∞ (stop) | | |
| d2 = 0.100000 | | |
| r3 = 35.76587 (aspherical) | | |
| d3 = 0.800000 | $n_{d3}$ = 1.497 | $v_{d3}$ = 81.61 |
| r4 = −0.36963 (aspherical) | | |
| d4 = 0.100000 | | |
| r5 = ∞ | | |
| d5 = 1.324427 | $n_{d5}$ = 1.80518 | $v_{d5}$ = 25.40 |
| r6 = ∞ | | |
| d6 = 0.020000 | $n_{d6}$ = 1.333 | $v_{d6}$ = 55.79 |
| r7 = ∞ (scanning plane) | | |

Aspherical coefficients
Third surface

| | |
|---|---|
| K = −49005.90164 | |
| A = 0.317821 × 10⁰ | B = −0.176726 × 10² |
| C = 0.668891 × 10² | D = −0.901447 × 10³ |

Fourth surface

| | |
|---|---|
| K = −0.453907 | |
| A = 0.339286 × 10¹ | B = −0.946604 × 10¹ |
| C = 0.137993 × 10² | D = 0.998707 × 10² |

Figure 20:
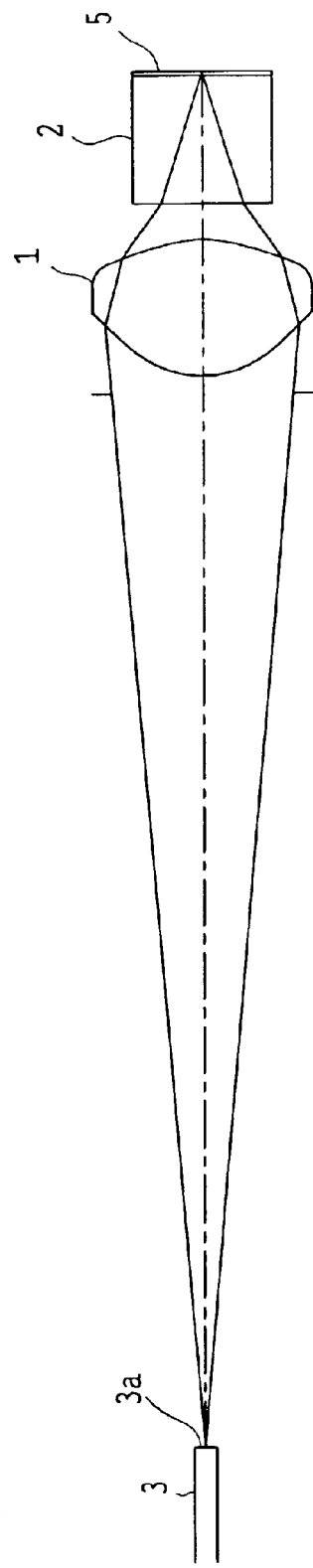
FIG. 20 is a view showing the optical path of the objective lens of a fifth embodiment in the present invention.

FIG. 20 shows the optical path of the objective lens of the fifth embodiment in the present invention. In this embodiment also, like numerals are used for like optical members with respect to the first embodiment. The wave aberration is 0.0226λ (RMS). The lateral magnification is 0.153, the NA is 0.55, and the focal length is 1.0946 (mm).

Optical data of the fifth embodiment are shown below.

| | | |
|---|---|---|
| r1 = ∞ (fiber end face 3a) | | |
| d1 = 5.823907 | | |
| r2 = ∞ (stop) | | |
| d2 = 0.100000 | | |
| r3 = 0.52134 (aspherical) | | |
| d3 = 0.756067 | $n_{d3}$ = 1.43875 | $v_{d3}$ = 95.00 |
| r4 = −0.60459 (aspherical) | | |
| d4 = 9.300000 | | |

-continued

| | | |
|---|---|---|
| r5 = −1.00000 | | |
| d5 = 0.700000 | $n_{d5}$ = 1.92286 | $v_{d5}$ = 18.90 |
| r6 = ∞ | | |
| d6 = 0.020000 | $n_{d6}$ = 1.333 | $v_{d6}$ = 55.79 |
| r7 = ∞ (scanning plane) | | |

Aspherical coefficients
Third surface

| | |
|---|---|
| K = −0.798140 | |
| A = −0.454231 × 10⁻¹ | B = −0.181297 × 10⁰ |
| C = 0.103139 × 10¹ | D = −0.577724 × 10¹ |

Fourth surface

| | |
|---|---|
| K = 0.036652 | |
| A = 0.313281 × 10¹ | B = −0.712160 × 10¹ |
| C = 0.120575 × 10² | D = 0.523017 × 10¹ |

Figure 21:
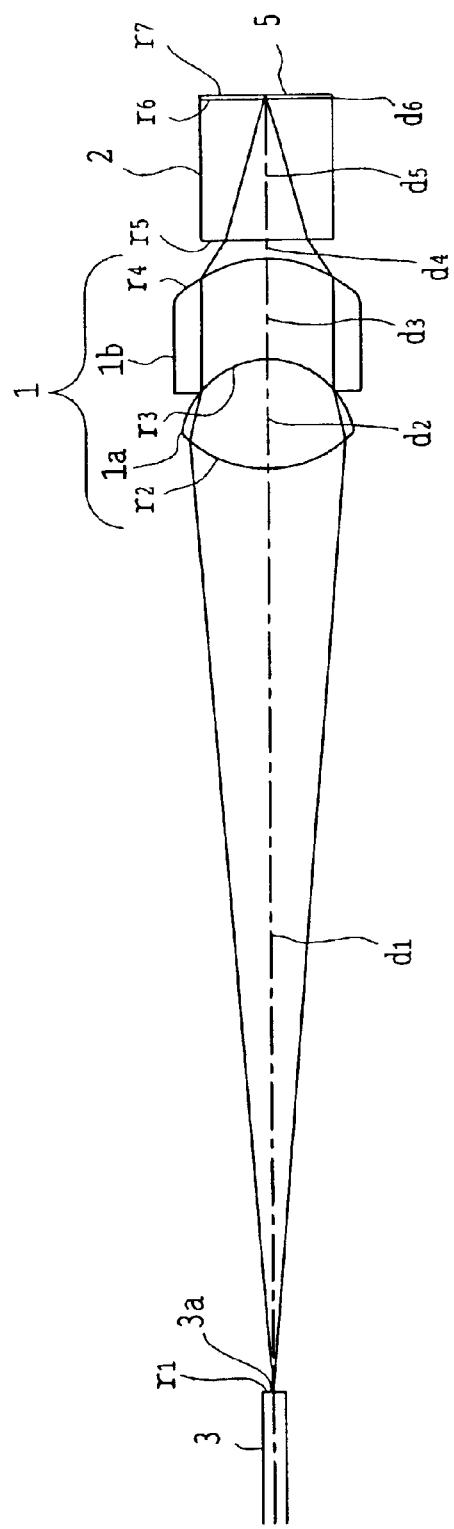
FIG. 21 is a view showing the optical path of the objective lens of a sixth embodiment in the present invention.

FIG. 21 shows the optical path of the objective lens of the sixth embodiment in the present invention. In this embodiment also, like numerals are used for like optical members with respect to the first embodiment. The wave aberration is 0.0371λ (RMS). The lateral magnification is 0.153, the NA is 0.55, and the focal length is 1.0882 (mm).

Optical data of the sixth embodiment are shown below.

| | | |
|---|---|---|
| r1 = ∞ (fiber end face 3a) | | |
| d1 = 5.409646 | | |
| r2 = 0.76289 | | |
| d2 = 0.633904 | $n_{d2}$ = 1.58913 | $v_{d2}$ = 61.30 |
| r3 = −0.53141 | | |
| d3 = 0.600000 | $n_{d3}$ = 1.81474 | $v_{d3}$ = 37.07 |
| r4 = −0.55587 (aspherical) | | |
| d4 = 0.115439 | | |
| r5 = −10.00000 | | |
| d5 = 0.821012 | $n_{d5}$ = 1.92286 | $v_{d5}$ = 18.90 |
| r6 = ∞ | | |
| d6 = 0.020000 | $n_{d6}$ = 1.333 | $v_{d6}$ = 55.79 |
| r7 = ∞ (scanning plane) | | |

Aspherical coefficients
Fourth surface

| | |
|---|---|
| K = −0.049097 | |
| A = 0.284393 × 10¹ | B = −0.804974 × 10¹ |
| C = 0.166032 × 10² | D = 0.870825 × 10¹ |

Figure 22:
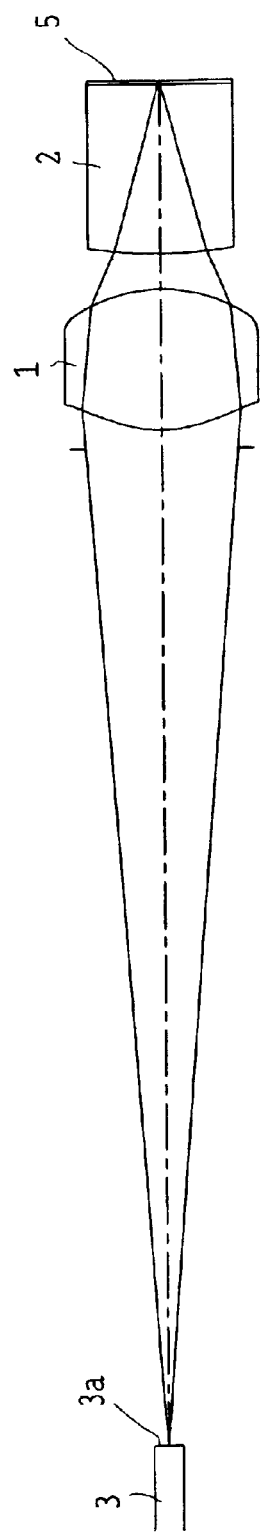
FIG. 22 is a view showing the optical path of the objective lens of a seventh embodiment in the present invention.

FIG. 22 shows the optical path of the objective lens of the seventh embodiment in the present invention. In this embodiment also, like numerals are used for like optical members with respect to the first embodiment. The wave aberration is 0.0469λ (RMS). The lateral magnification is 0.153, the NA is 0.5, and the focal length is 1.0844 (mm).

Optical data of the seventh embodiment are shown below.

| | | |
|---|---|---|
| r1 = ∞ (fiber end face 3a) | | |
| d1 = 5.555191 | | |
| r2 = ∞ (stop) | | |
| d2 = 0.100000 | | |
| r3 = 0.80925 (aspherical) | | |
| d3 = 0.784202 | $n_{d3}$ = 1.497 | $v_{d3}$ = 81.61 |
| r4 = −0.76127 (aspherical) | | |
| d4 = 0.2 | | |
| r5 = 2.50000 | | |
| d5 = 0.940607 | $n_{d5}$ = 1.92286 | $v_{d5}$ = 18.9 |
| r6 = ∞ | | |
| d6 = 0.02 | $n_{d6}$ = 1.333 | $v_{d6}$ = 55.79 |
| r7 = ∞ (scanning plane) | | |

Aspherical coefficients

Third surface

| | | |
|---|---|---|
| K = −0.838606 | | |
| A = −0.655063 × 10$^{-1}$ | | B = −0.640416 × 10$^{0}$ |
| C = −0.209672 × 10$^{1}$ | | D = 0.932104 × 10$^{0}$ |

Fourth surface

| | | |
|---|---|---|
| K = 0.973645 | | |
| A = 0.149933 × 10$^{1}$ | | B = −0.451277 × 10$^{1}$ |
| C = 0.142273 × 10$^{2}$ | | D = 0.192981 × 10$^{1}$ |

Figure 23:
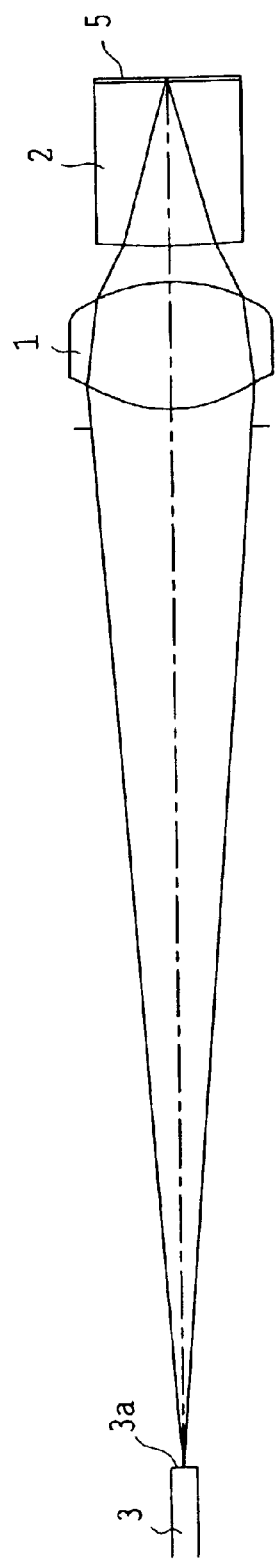
FIG. 23 is a view showing the optical path of the objective lens of an eighth embodiment in the present invention.

FIG. 23 shows the optical path of the objective lens of the eighth embodiment in the present invention. In this embodiment also, like numerals are used for like optical members with respect to the first embodiment. The wave aberration is 0.026λ (RMS). The lateral magnification is 0.153, the NA is 0.5, and the focal length is 1.0835 (mm).

Optical data of the eighth embodiment are shown below.

| | | |
|---|---|---|
| r1 = ∞ (fiber end face 3a) | | |
| d1 = 5.683586 | | |
| r2 = ∞ (stop) | | |
| d2 = 0.100000 | | |
| r3 = 0.70163 (aspherical) | | |
| d3 = 0.700000 | $n_{d3}$ = 1.497 | $v_{d3}$ = 81.61 |
| r4 = −0.75374 (aspherical) | | |
| d4 = 0.2 | | |
| r5 = 5.00000 | | |
| d5 = 0.896413 | $n_{d5}$ = 1.92286 | $v_{d5}$ = 18.9 |
| r6 = ∞ | | |
| d6 = 0.02 | $n_{d6}$ = 1.333 | $v_{d6}$ = 55.79 |
| r7 = ∞ (scanning plane) | | |

Aspherical coefficients

Third surface

| | | |
|---|---|---|
| K = −0.777766 | | |
| A = −0.399211 × 10$^{-1}$ | | B = −0.445097 × 10$^{0}$ |
| C = −0.169426 × 10$^{1}$ | | D = −0.372513 × 10$^{1}$ |

Fourth surface

| | | |
|---|---|---|
| K = 0.871673 | | |
| A = 0.174726 × 10$^{1}$ | | B = −0.481677 × 10$^{1}$ |
| C = 0.109676 × 10$^{2}$ | | D = 0.742922 × 10$^{1}$ |

Figure 24:
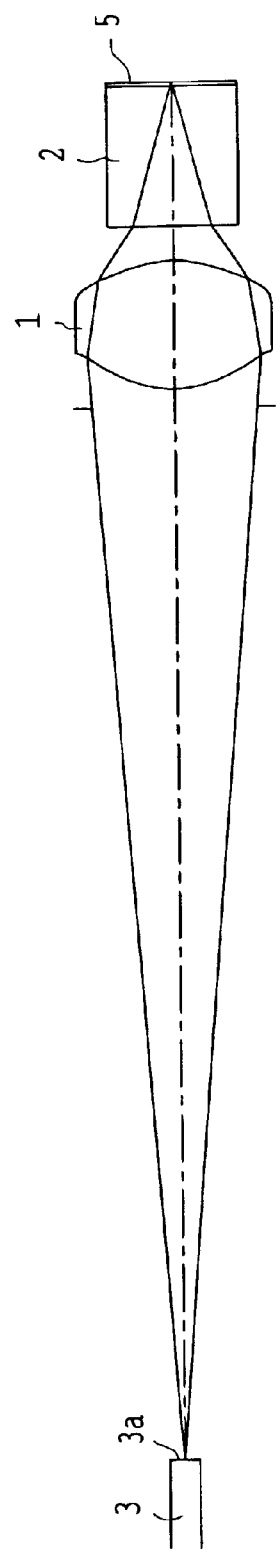
FIG. 24 is a view showing the optical path of the objective lens of a ninth embodiment in the present invention.

FIG. 24 shows the optical path of the objective lens of the ninth embodiment in the present invention. In this embodiment also, like numerals are used for like optical members with respect to the first embodiment. The wave aberration is 0.0228λ (RMS). The lateral magnification is 0.153, the NA is 0.5, and the focal length is 1.0820 (mm).

Optical data of the ninth embodiment are shown below.

| | | |
|---|---|---|
| r1 = ∞ (fiber end face 3a) | | |
| d1 = 5.810000 | | |
| r2 = ∞ (stop) | | |
| d2 = 0.100000 | | |
| r3 = 0.60872 (aspherical) | | |
| d3 = 0.700000 | $n_{d3}$ = 1.497 | $v_{d3}$ = 81.61 |
| r4 = −0.63779 (aspherical) | | |
| d4 = 0.2 | | |
| r5 = −5.00000 | | |
| d5 = 0.770000 | $n_{d5}$ = 1.92286 | $v_{d5}$ = 18.9 |
| r6 = ∞ | | |
| d6 = 0.02 | $n_{d6}$ = 1.333 | $v_{d6}$ = 55.79 |
| r7 = ∞ (scanning plane) | | |

Aspherical coefficients

Third surface

| | | |
|---|---|---|
| K = −0.729290 | | |
| A = −0.239433 × 10$^{-1}$ | | B = −0.308885 × 10$^{0}$ |
| C = 0.150620 × 10$^{1}$ | | D = −0.213323 × 10$^{2}$ |

Fourth surface

| | | |
|---|---|---|
| K = 0.462668 | | |
| A = 0.274744 × 10$^{1}$ | | B = −0.635226 × 10$^{1}$ |
| C = 0.143551 × 10$^{1}$ | | D = 0.545212 × 10$^{2}$ |

Figure 25:
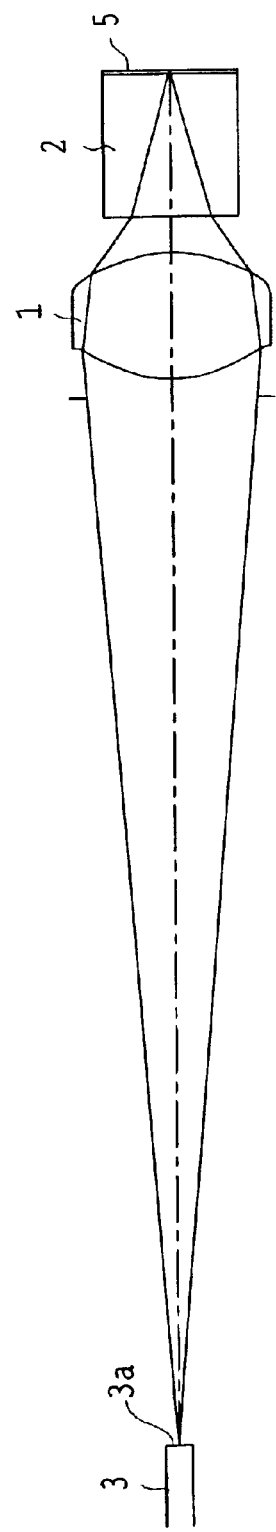
FIG. 25 is a view showing the optical path of the objective lens of a tenth embodiment in the present invention.

FIG. 25 shows the optical path of the objective lens of the tenth embodiment in the present invention. In this embodiment also, like numerals are used for like optical members with respect to the first embodiment. The wave aberration is 0.0225λ (RMS). The lateral magnification is 0.153, the NA is 0.5, and the focal length is 1.0793 (mm).

Optical data of the tenth embodiment are shown below.

| | | |
|---|---|---|
| r1 = ∞ (fiber end face 3a) | | |
| d1 = 5.800000 | | |
| r2 = ∞ (stop) | | |
| d2 = 0.100000 | | |
| r3 = 0.63215 (aspherical) | | |
| d3 = 0.700000 | $n_{d3}$ = 1.497 | $v_{d3}$ = 81.61 |
| r4 = −0.57619 (aspherical) | | |
| d4 = 0.2 | | |

-continued r5 = 3.50000
 d5 = 0.780000 $n_{d5}$ = 1.92286 $v_{d5}$ = 18.9
r6 = ∞
 d6 = 0.02 $n_{d6}$ = 1.333 $v_{d6}$ = 55.79
r7 = ∞ (scanning plane)

Aspherical coefficients
Third surface

K = −0.676982
A = −0.385298 × 10⁻¹ B = −0.286254 × 10⁰
C = 0.227250 × 10¹ D = −0.300677 × 10²

Fourth surface

K = 0.221761
A = 0.324830 × 10¹ B = −0.736130 × 10¹
C = −0.241903 × 10¹ D = 0.785435 × 10²

Figure 26:
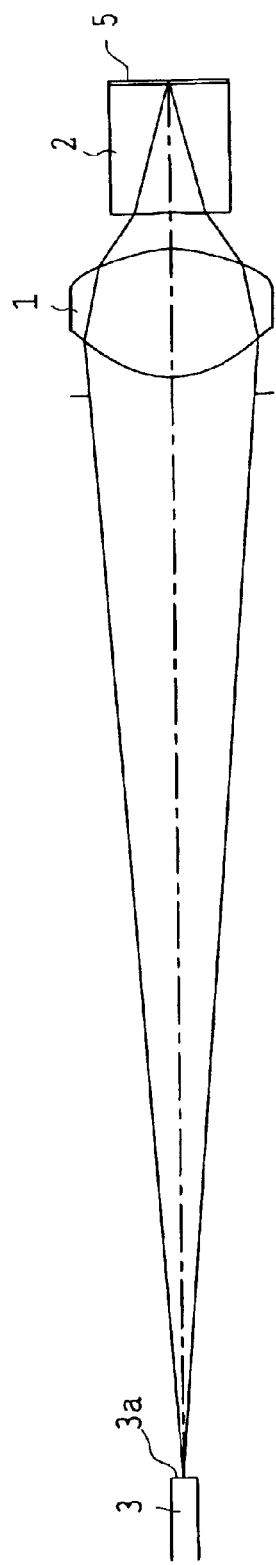
FIG. 26 is a view showing the optical path of the objective lens of an eleventh embodiment in the present invention.

FIG. 26 shows the optical path of the objective lens of the eleventh embodiment in the present invention. In this embodiment also, like numerals are used for like optical members with respect to the first embodiment. The wave aberration is 0.0394λ (RMS). The lateral magnification is 0.153, the NA is 0.5, and the focal length is 1.0795 (mm).

Optical data of the eleventh embodiment are shown below.

r1 = ∞ (fiber end face 3a)
 d1 = 5.880000
r2 = ∞ (stop)
 d2 = 0.100000
r3 = 0.55985 (aspherical)
 d3 = 0.700000 $n_{d3}$ = 1.497 $v_{d3}$ = 81.61
r4 = −0.62742 (aspherical)
 d4 = 0.2
r5 = 2.50000
 d5 = 0.700000 $n_{d5}$ = 1.92286 $v_{d5}$ = 18.9
r6 = ∞
 d6 = 0.02 $n_{d6}$ = 1.333 $v_{d6}$ = 55.79
r7 = ∞ (scanning plane)

Aspherical coefficients
Third surface

K = −0.718672
A = −0.259057 × 10⁻¹ B = −0.510535 × 10⁻¹
C = 0.235208 × 10¹ D = −0.174945 × 10²

Fourth surface

K = 0.276183
A = 0.297392 × 10¹ B = −0.611059 × 10¹
C = −0.347151 × 10⁻¹ D = 0.434561 × 10²

Figure 27:
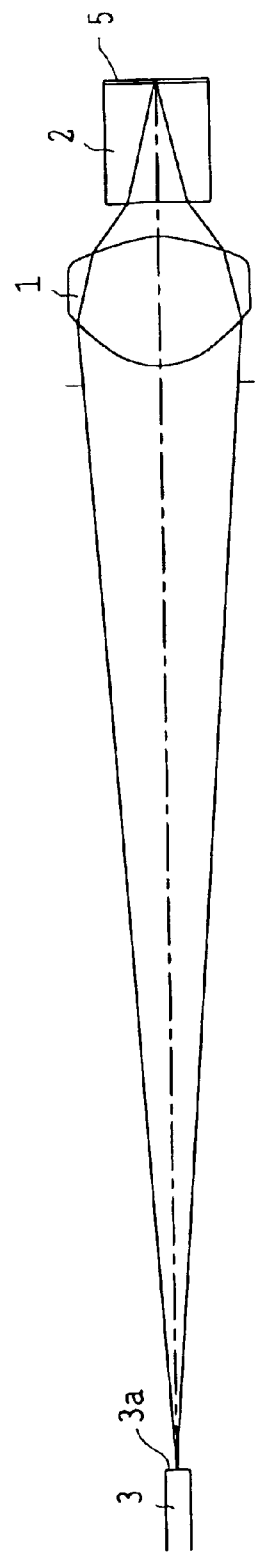
FIG. 27 is a view showing the optical path of the objective lens of a twelfth embodiment in the present invention.

FIG. 27 shows the optical path of the objective lens of the twelfth embodiment in the present invention. In this embodiment also, like numerals are used for like optical members with respect to the first embodiment. The wave aberration is 0.0571λ (RMS). The lateral magnification is 0.153, the NA is 0.5, and the focal length is 1.0761 (mm).

Optical data of the twelfth embodiment are shown below.

r1 = ∞ (fiber end face 3a)
 d1 = 5.945074
r2 = ∞ (stop)
 d2 = 0.100000
r3 = 0.51787 (aspherical)
 d3 = 0.700000 $n_{d3}$ = 1.497 $v_{d3}$ = 81.61
r4 = −0.64866 (aspherical)
 d4 = 0.2
r5 = −1.77000
 d5 = 0.634926 $n_{d5}$ = 1.92286 $v_{d5}$ = 18.9
r6 = ∞
 d6 = 0.02 $n_{d6}$ = 1.333 $v_{d6}$ = 55.79
r7 = ∞ (scanning plane)

Aspherical coefficients
Third surface

K = −0.662927
A = 0.589699 × 10⁻¹ B = −0.350177 × 10⁰
C = 0.629612 × 10¹ D = −0.282512 × 10²

Fourth surface

K = 0.467756
A = 0.365760 × 10¹ B = −0.883522 × 10¹
C = −0.484146 × 10¹ D = 0.855324 × 10²

In the optical data of each of the above embodiments, reference symbols r1, r2, . . . represent radii of curvature of the surfaces of individual lenses; d1, d2, . . . represent thicknesses of individual lenses or spaces therebetween; $n_{d1}$, $n_2$, . . . represent refractive indices of individual lenses in the d line; and $v_{d1}$, $v_{d2}$, . . . represent Abbe's numbers of individual lenses.

Also, when Z is taken as the coordinate in the direction of the optical axis, y is taken as the coordinate in the direction normal to the optical axis, K denotes a conic constant, and A, B, C, and D denote aspherical coefficients, the configuration of each of the aspherical surfaces in the embodiments is expressed by the following equation:

$$Z=(y^2/r)/[1+\{1-(1+K)\cdot(y/r)^2\}^{1/2}]+Ay^2+By^4+Cy^6Dy_8$$

Figure 28:
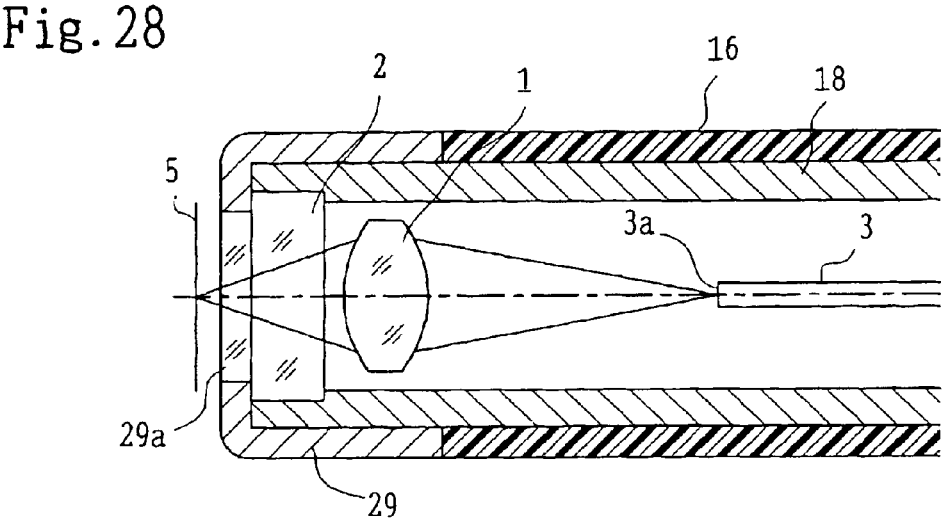
FIG. 28 is a sectional view schematically showing the objective lens of a thirteenth embodiment in the present invention.

FIG. 28 shows the objective lens of the thirteenth embodiment in the present invention. In FIG. 28 and FIGS. 29–31B to be described later, like numerals are used for like members with respect to FIG. 12. The members of the optical unit 19 are omitted from the figures, except for the converging optical system 1, the glass cover 2, and the optical fiber 3.

In this embodiment, a cap 29 is removably mounted in front of the lens (the second lens unit) 2. In order to prevent damage and tarnish of the surface of the lens, the cap 29 is provided with a protective glass plate 29a. The embodiment is constructed as mentioned above, and thus when the protective glass plate 29a is damaged or tarnished, the cap 29 is removed and cleaned, and thereby the protective glass plate 29a can be made clean. Alternatively, the cap 29 may be replaced with another, together with the protective glass plate 29a.

Figure 29:
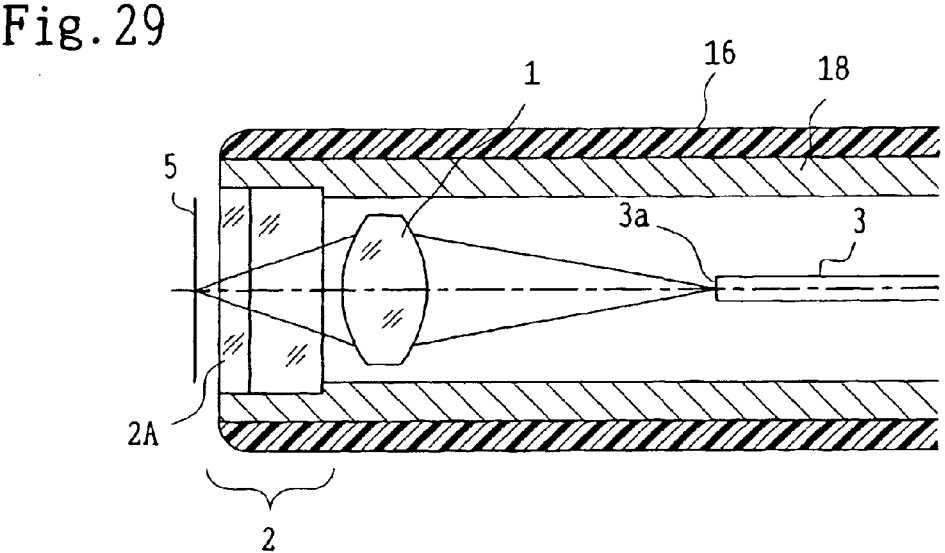
FIG. 29 is a sectional view schematically showing the objective lens of a fourteenth embodiment in the present invention.

FIG. 29 shows the objective lens of the fourteenth embodiment in the present invention. In this embodiment as well, a detailed structure of the optical unit 19 is omitted as in the thirteenth embodiment. The embodiment has the same structure as the thirteenth embodiment with the exception that a protective glass plate 2A is cemented to the lens 2 as the second lens unit.

Figure 30:
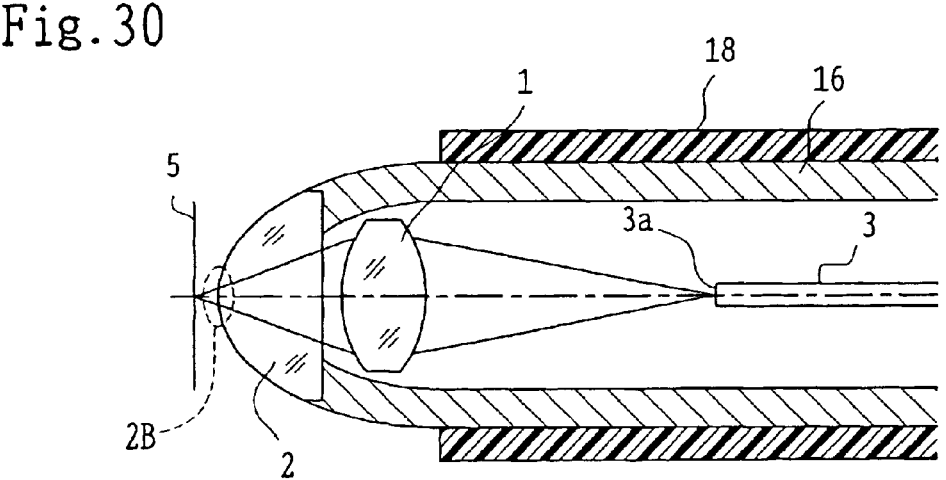
FIG. 30 is a sectional view schematically showing the objective lens of a fifteenth embodiment in the present invention.

FIG. 30 shows the objective lens of the fifteenth embodiment in the present invention. In this embodiment, a specimen-side surface of the lens 2 is configured to be spherical and the top of the optical frame 16 is also configured to match the surface of the lens 2. This construction serves to obviate the danger that the specimen is damaged.

In this case, a gap between the specimen surface 5 and the lens 2 is filled with water, and a ray height at the specimen-side surface of the lens 2 is extremely low. As such, the deterioration of imaging performance caused by the spherical surface of the lens 2 is minimized. Also, when such deterioration must be particularly suppressed, it is only necessary to grind an area 2B of the spherical surface of the lens 2 through which a ray of light passes, to a plane surface.

Figure 31A:
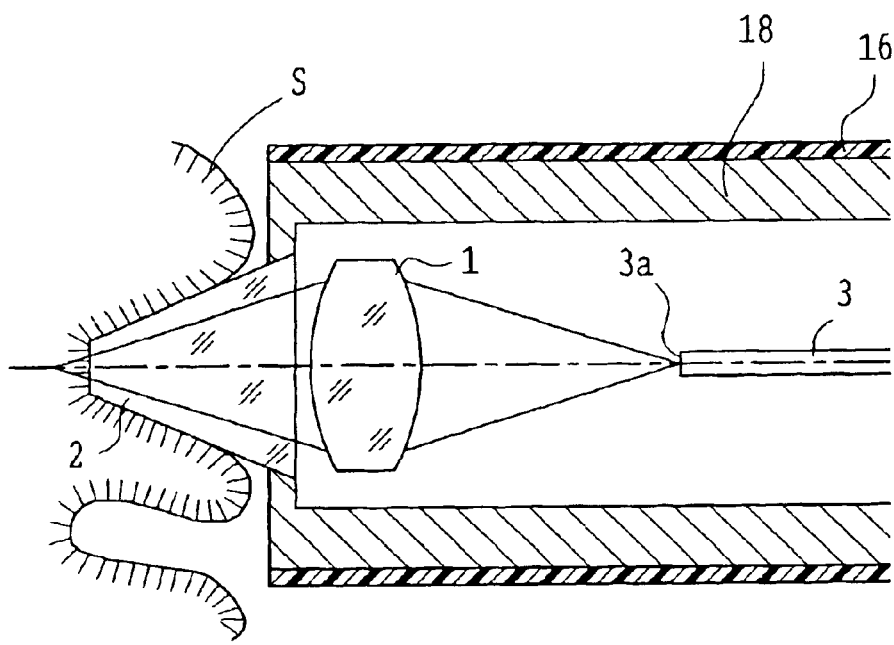
FIG. 31A is a sectional view schematically showing the objective lens of a sixteenth embodiment in the present invention.
Figure 31B:
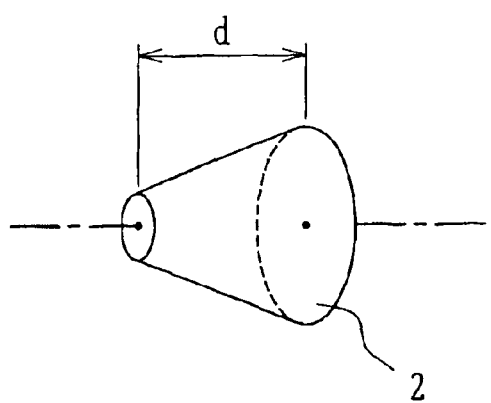
FIG. 31B is a perspective view showing the second lens unit.

FIG. 31A shows the objective lens of the sixteenth embodiment in the present invention. In this embodiment, the lens 2 as the second lens unit is shaped into a truncated cone form which tapers down to a point toward a specimen S and has a vertex of a plane or convex surface. In this way, the embodiment is constructed so that when the specimen S is a living body, even a concavity can be observed. In particular, when the lens 2 is constructed of a glass material of relatively low dispersion, a thickness d (see FIG. 31B) can be increased. This is favorable for the embodiment.

What is claimed is:

1. An objective lens comprising:

a first lens unit with positive refracting power; and a second lens unit placed on a specimen side of said first lens unit, wherein said first lens unit includes at least one lens and said second lens unit includes at least one optical element, satisfying the following conditions:

$$\nu_{dLD} > \nu_{dHD}$$
$$-0.56 \leq \phi_{II\textcircled{1}} / \phi_T \leq 0.56$$

where $\nu_{dLD}$ is an Abbe's number of glass material of said lens, $\nu_{dHD}$ is an Abbe's number of glass material of said optical element, $\phi_{II\textcircled{1}}$ is a refracting power of a first surface of said second lens unit, and $\phi_T$ is a refracting power of an entire system of said objective lens.

2. An objective lens according to claim 1, further satisfying the following conditions:

$$\nu_{dHD} \leq 26$$
$$d_{II}\phi_T \geq 0.63$$

where $d_{II}$ is a face-to-face spacing of said optical element of said second lens unit.

3. An objective lens according to claim 2, further satisfying the following condition:

$$R_{I\textcircled{1}}/R_{I\textcircled{2}} \leq -0.7$$

where $R_{I\textcircled{1}}$ is a paraxial radius of curvature of a first surface of said first lens unit and $R_{I\textcircled{2}}$ is a paraxial radius of curvature of a second surface thereof.

4. An objective lens according to claim 1, wherein said first lens unit is a cemented doublet and satisfies the following condition:

$$\nu_{dLD} > \nu_{d\ I\ (2)} > \nu_{dHD},$$

where $\nu_{dLD}$ is an Abbe's number of glass material of one lens of said cemented doublet and $\nu_{d\ I\ (2)}$ is an Abbe's number of glass material of a remaining lens.

5. An objective lens according to claim 1, further satisfying the following condition:

$$R_{I\textcircled{1}}/R_{I\textcircled{2}} \leq -0.7$$

where $R_{I\textcircled{1}}$ is a paraxial radius of curvature of a first surface of said first lens unit and $R_{I\textcircled{2}}$ is a paraxial radius of curvature of a second surface thereof.

6. A scanning microscope comprising:

a probe section having an objective lens, an actuator, and an optical fiber; and a body section having a point source, a photodetector, and a light-splitting element, said objective lens comprising:

a first lens unit with positive refracting power; and a second lens unit placed on a specimen side of said first lens unit, wherein said first lens unit includes at least one lens and said second lens unit includes at least one optical element, satisfying the following conditions:

$$\nu_{dLD} > \nu_{dHD}$$
$$-0.56 \leq \phi_{II\textcircled{1}} / \phi_T \leq 0.56$$

where $\nu_{dLD}$ is an Abbe's number of glass material of said lens, $\nu_{dHD}$ is an Abbe's number of glass material of said optical element, $\phi_{II\textcircled{1}}$ is a refracting power of a first surface of said second lens unit, and $\phi_T$ is a refracting power of an entire system of said objective lens.

7. A scanning microscope according to claim 6, further satisfying the following conditions:

$$\nu_{dHD} \leq 26$$
$$d_{II}\phi_T \geq 0.63$$

where $d_{II}$ is a face-to-face spacing of said optical element of said second lens unit of said objective lens.

* * * * *

UNITED STATES PATENT AND TRADEMARK OFFICE
CERTIFICATE OF CORRECTION

PATENT NO. : 6,710,938 B2
DATED : March 23, 2004
INVENTOR(S) : Hiroya Fukuyama

It is certified that error appears in the above-identified patent and that said Letters Patent is hereby corrected as shown below:

<u>Column 16,</u>
Line 39, change "$n_2$ ... represents" to -- $n_{d2}$, ... represents --

Line 50, change "$Z=(y^2/r)/[1+\{1-(1+K)(y/r)^2\}^{1/2}]+Ay^2+By^4+Cy^6Dy_8$"

to -- $Z=(y^2/r)/[1+\{1-(1+K)(y/r)^2\}^{1/2}]+Ay^2+By^4+Cy^6Dy^8$ --.

Signed and Sealed this

Eighth Day of February, 2005

JON W. DUDAS
*Director of the United States Patent and Trademark Office*